(12) United States Patent
Li et al.

(10) Patent No.: US 12,371,002 B2
(45) Date of Patent: Jul. 29, 2025

(54) METHOD AND DEVICE FOR DRIVING HYBRID ELECTRIC VEHICLE, AND VEHICLE

(71) Applicant: GREAT WALL MOTOR COMPANY LIMITED, Hebei (CN)

(72) Inventors: Yunfei Li, Hebei (CN); Qilin Chen, Hebei (CN); Chengjian Xing, Hebei (CN); Nan Zhang, Hebei (CN); Yifei Zhang, Hebei (CN); Cheng Chang, Hebei (CN); Chenxi Su, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 251 days.

(21) Appl. No.: 18/010,339

(22) PCT Filed: Sep. 6, 2021

(86) PCT No.: PCT/CN2021/116796
§ 371 (c)(1),
(2) Date: Dec. 14, 2022

(87) PCT Pub. No.: WO2022/048673
PCT Pub. Date: Mar. 10, 2022

(65) Prior Publication Data
US 2023/0249668 A1 Aug. 10, 2023

(30) Foreign Application Priority Data
Sep. 7, 2020 (CN) .......................... 202010929961.6

(51) Int. Cl.
*B60W 20/20* (2016.01)
*B60W 10/06* (2006.01)
(Continued)

(52) U.S. Cl.
CPC ............ *B60W 20/20* (2013.01); *B60W 10/06* (2013.01); *B60W 10/08* (2013.01); *B60W 20/15* (2016.01); *B60W 2510/0638* (2013.01)

(58) Field of Classification Search
CPC ...... B60W 20/20; B60W 10/06; B60W 10/08; B60W 20/15; B60W 2510/0638;
(Continued)

(56) References Cited

U.S. PATENT DOCUMENTS

2018/0170356 A1* 6/2018 Lee ...................... B60W 10/06

FOREIGN PATENT DOCUMENTS

| CN | 104417544 A | 3/2015 |
|---|---|---|
| CN | 104590248 A | 5/2015 |

(Continued)

OTHER PUBLICATIONS

International Search Report for PCT/CN2021/116796 issued Oct. 28, 2021.

*Primary Examiner* — Muhammad Shafi
(74) *Attorney, Agent, or Firm* — Schmeiser, Olsen & Watts LLP

(57) ABSTRACT

A method and a device for driving a hybrid electric vehicle, and a vehicle is provided. The method includes: driving, if the vehicle demand torque is greater than a minimum value of the engine economic zone and less than a maximum value of the power assistance reserve zone, the hybrid electric vehicle in a parallel drive mode; or maintaining, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor.

12 Claims, 6 Drawing Sheets

(51) Int. Cl.
*B60W 10/08* (2006.01)
*B60W 20/15* (2016.01)

(58) Field of Classification Search
CPC ..... B60W 2510/0657; B60W 2540/10; B60W 2540/106; B60W 2710/0666; B60W 2710/083; B60W 20/11; B60W 30/182; B60W 20/10; B60W 30/18; B60K 6/442; Y02T 10/62
USPC .......................................................... 701/22
See application file for complete search history.

(56) References Cited

FOREIGN PATENT DOCUMENTS

| | | | |
|---|---|---|---|
| CN | 105035089 | A | 11/2015 |
| CN | 105620467 | * | 6/2016 |
| CN | 105620467 | A | 6/2016 |
| CN | 105730433 | A | 7/2016 |
| CN | 107487317 | A | 12/2017 |
| CN | 109383486 | A | 2/2019 |
| CN | 109458252 | * | 3/2019 |
| CN | 110217221 | A | 9/2019 |
| CN | 110949368 | A | 4/2020 |
| CN | 111267833 | A | 6/2020 |
| CN | 111439252 | A | 7/2020 |
| CN | 111483327 | A | 8/2020 |
| CN | 112124297 | A | 12/2020 |
| JP | 2014133457 | A | 7/2014 |
| JP | 2018154230 | A | 10/2018 |
| WO | WO-2018011968 | * | 1/2018 |

* cited by examiner

METHOD AND DEVICE FOR DRIVING HYBRID ELECTRIC VEHICLE, AND VEHICLE

CROSS-REFERENCE TO RELATED APPLICATIONS

This application claims priority to PCT/CN2021/116796, having a filing date of Sep. 6, 2021, which is based on Chinese Patent Application No. 202010929961.6, having a filing date of Sep. 7, 2020, the entire contents both of which are hereby incorporated by reference.

FIELD OF TECHNOLOGY

The following relates to the field of hybrid electric vehicles, and more particularly to a method and a device for driving a hybrid electric vehicle, and a vehicle.

BACKGROUND

In hybrid vehicles, different system architectures are divided to optimize various performance indicators to the maximum extent. For the architecture of maximizing the efficiency of the vehicle, there is a system architecture that divides the vehicle drive mode into a parallel drive mode, a series drive mode, and a pure electric drive mode. When the vehicle is driven by the series drive mode, the engine works to supply power to the drive motor, and the maximum torque that the vehicle can provide is the maximum torque that the drive motor can provide; when the vehicle is driven by the parallel drive mode, the engine directly provides power for the vehicle and drives the vehicle in parallel with the drive motor. Furthermore, the maximum torque that the vehicle can provide is the maximum torque that the drive motor can provide and the maximum torque that the engine can provide. That is, the maximum torque that the vehicle can provide when driven by the parallel drive mode is the maximum torque that the vehicle can provide.

The vehicle control unit (VCU) determines the best drive mode of the vehicle according to the power demand of the driver and the state of vehicle for driving the vehicle. In the related driving field, when the torque demand of the vehicle is within the working economic zone corresponding to the current engine speed, the vehicle is driven by the parallel drive mode; in addition, when the torque demand of the vehicle is higher than the maximum torque that the drive motor can provide at the current engine speed, the vehicle is also driven in the parallel drive mode.

However, if the torque demand of the vehicle when driving fluctuates in the economic zone corresponding to the current speed or near the maximum torque that the drive motor can provide, frequent switching between series and parallel modes will occur.

SUMMARY

An aspect relates to a method and a device for driving a hybrid electric vehicle, and a vehicle, in order to solve the problem in the conventional art that when the torque demand of the vehicle when driving fluctuates in the economic zone corresponding to the current speed or near the maximum torque that the drive motor can provide, frequent switching between series and parallel modes will occur.

In order to achieve above-mentioned aspect, the present disclosure provides a method for driving a hybrid electric vehicle. The hybrid electric vehicle includes a drive motor and an engine, and the method includes:

acquiring, through a vehicle control unit, a current driving information of the hybrid electric vehicle, wherein the current driving information comprises a current speed of the engine and a vehicle demand torque of the hybrid electric vehicle;

determining, according to the current speed, through the vehicle control unit, an engine economic zone and a power assistance reserve zone corresponding to the current speed, wherein the engine economic zone and the power assistance reserve zone are zones representing a torque range; and driving, through the drive motor, if the vehicle demand torque is greater than a minimum value of the engine economic zone and less than a maximum value of the power assistance reserve zone, the hybrid electric vehicle in a parallel drive mode; or maintaining, through the vehicle control unit, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor.

In an embodiment, the step of determining an engine economic zone and a power assistance reserve zone corresponding to the current speed includes:

acquiring an optimal operating point of the engine corresponding to the current speed according to the current speed, and determining the engine economic zone according to the optimal operating point of the engine, wherein the optimal operating point of the engine is positively related to the current speed and is within the engine economic zone; and determining the power assistance reserve zone according to the engine economic zone, wherein a minimum value of the power assistance reserve zone is a maximum value of the engine economic zone, and a vehicle torque corresponding to the maximum value of the power assistance reserve zone is less than a maximum torque that the drive motor is able to provide.

In an embodiment, the method further includes:

switching to, if after the vehicle demand torque continues to increase to the maximum value of the power assistance reserve zone, and the vehicle demand torque does not increase to a maximum torque that the drive motor is able to provide within a preset time, a series drive mode to drive the hybrid electric vehicle when the hybrid electric vehicle is in the parallel drive mode and a torque provided by the parallel drive mode under a current drive mode is greater than a maximum torque provided by the drive motor.

In an embodiment, the method further includes:

controlling, if the vehicle demand torque is greater than a maximum value of the engine economic zone and the vehicle demand torque is less than a maximum value of the power assistance reserved zone, the engine to provide a torque less than the maximum value of the engine economic zone, and controlling the drive motor to provide a torque equal to a difference between the vehicle demand torque and a torque provided by the engine when the hybrid electric vehicle is in the parallel drive mode, if the vehicle demand torque is greater than a maximum value of the engine economic zone and the vehicle demand torque is less than a maximum value of the power assistance reserved zone.

In an embodiment, the hybrid electric vehicle includes drive modes, and the drive modes include a series drive mode and a parallel drive mode, and the method further includes:

sending, if the vehicle demand torque is greater than a minimum value of the engine economic zone, and the vehicle demand torque is less than a maximum value of the power assistance reserved zone, a mode switching command to switch the hybrid electric vehicle from the series drive mode to the parallel drive mode when the hybrid electric vehicle is in the series drive mode.

In an embodiment, the hybrid electric vehicle includes drive modes, and the drive modes include a series drive mode and a parallel drive mode, and the method further includes:

sending, if the vehicle demand torque is greater than the maximum torque that the drive motor is able to provide, a mode switching command to switch the hybrid electric vehicle to the parallel drive mode when the hybrid electric vehicle is in the series drive mode and a torque that the parallel drive mode is able to provide is greater than a maximum torque that the drive motor is able to provide under a current drive mode.

The present disclosure further provides a device for driving a hybrid electric vehicle. The hybrid electric vehicle includes a drive motor and an engine, and the device includes: an acquisition module, a processor, a first controller, and/or a second controller. The acquisition module is configured for acquiring a current driving information of the hybrid electric vehicle, wherein the current driving information comprises a current speed of the engine and a vehicle demand torque of the hybrid electric vehicle; the a processor is configured for determining, according to the current speed, an engine economic zone and a power assistance reserve zone corresponding to the current speed, wherein the engine economic zone and the power assistance reserve zone are zones representing a torque range; the first controller is configured for driving the hybrid electric vehicle in a parallel drive mode when the vehicle demand torque is greater than a minimum value of the engine economic zone and less than a maximum value of the power assistance reserve zone; and/or the second controller is configured for maintaining, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor.

In an embodiment, the second controller is further configured for:

maintaining, if the demand torque of the vehicle is greater than the maximum value of the power assistance reserve zone and less than a maximum torque that the drive motor can provide, the parallel drive mode when the hybrid electric vehicle is in the parallel drive mode and the vehicle demand torque continues to increase, and the torque that the parallel drive mode is able to provide is greater than a maximum torque that the drive motor is able to provide under a current drive mode.

In an embodiment, the second controller is further configured for:

sending, if the vehicle demand torque does not increase to a maximum torque that the drive motor is able to provide within a preset time after the vehicle demand torque continues to increase to the maximum value of the power assistance reserve zone, a mode switching command to switch to a series drive mode to drive the hybrid electric vehicle when the hybrid electric vehicle is in the parallel drive mode and a torque provided by the parallel drive mode under a current drive mode is greater than a maximum torque provided by the drive motor.

In an embodiment, the second controller is further configured for:

controlling, if the vehicle demand torque is greater than a maximum value of the engine economic zone and the vehicle demand torque is less than a maximum value of the power assistance reserved zone, the engine to provide a torque less than the maximum value of the engine economic zone, and controlling the drive motor to provide a torque equal to a difference between the vehicle demand torque and a torque provided by the engine when the hybrid electric vehicle is in the parallel drive mode.

In an embodiment, the hybrid electric vehicle includes drive modes, and the drive modes include a series drive mode and a parallel drive mode, and the second controller is further configured for:

sending, if the vehicle demand torque is greater than a minimum value of the engine economic zone, and the vehicle demand torque is less than a maximum value of the power assistance reserved zone, a mode switching command to switch the hybrid electric vehicle from the series drive mode to the parallel drive mode when the hybrid electric vehicle is in the series drive mode.

In an embodiment, the hybrid electric vehicle includes drive modes, and the drive modes include a series drive mode and a parallel drive mode, and the second controller is further configured for:

sending, if the vehicle demand torque is greater than the maximum torque that the drive motor is able to provide, a mode switching command to switch the hybrid electric vehicle to the parallel drive mode when the hybrid electric vehicle is in the series drive mode and a torque that the parallel drive mode is able to provide is greater than a maximum torque that the drive motor is able to provide under a current drive mode.

The present disclosure further provides a hybrid electric vehicle. The hybrid electric vehicle includes a drive motor, an engine, and a drive device connected with the drive motor and the engine; the drive device is configured for executing the method for driving the hybrid electric vehicle as described above.

The present disclosure further provides a computing processing device. The computing processing device includes:
a memory, stored therein with computer-readable codes; and
at least one processors;
when the computer-readable codes are executed by the at least one processors, the computing processing device executes the method for driving a hybrid electric vehicle as described above.

The present disclosure further provides a computer-readable storage medium, and a computer program is stored therein, and the computer program includes computer-readable codes, when the computer-readable codes are executed by the computing processing device, the computing processing device executes the method for driving a hybrid electric vehicle as described above.

Additional aspects and advantages of the present disclosure will be given in part in the following description, and some will become apparent from the following description, or learned from the practice of the present disclosure.

BRIEF DESCRIPTION

Some of the embodiments will be described in detail, with references to the following Figures, wherein like designations denote like members, wherein.

DETAILED DESCRIPTION

The specific embodiments of the present disclosure are described in detail below in combination with the accompanying drawings. It should be understood that the specific embodiments described herein are only used to explain and interpret the disclosure and are not used to limit the disclosure.

In order to enable ordinary technicians in the conventional art to quickly understand the improvement of the technical solution provided by the embodiments of the present disclosure compared with the existing technology, the following first introduces the methods for driving hybrid vehicles in related technologies, in which the system architecture of the hybrid vehicle can be a system architecture aimed at maximizing the efficiency of the vehicle, and divides the vehicle drive mode into a parallel drive mode, a series drive mode and a pure electric drive mode.

In the related drive field, the vehicle control unit (VCU) determines the best drive mode of the vehicle according to the power demand of the driver and the state of vehicle for driving the vehicle. For example, when the torque demand of the vehicle is within the working economic zone corresponding to the current engine speed, the vehicle is driven by the parallel drive mode; in addition, when the maximum torque that can be provided by the parallel drive mode under the current drive mode is greater than the maximum torque that can be provided by the drive motor, and the torque demand of the vehicle is higher than the maximum torque that can be provided by the drive motor under the current engine speed, the parallel drive mode is switched to drive the vehicle.

It is worth noting that in the design of the vehicle, the drive modes are divided. In some drive modes, considering the engine operating efficiency or battery power, the maximum torque can be provided by the parallel drive mode may be less than the maximum torque can be provided by the drive motor, that is, the maximum torque can be provided by the serial drive mode. In the embodiments provided by the present disclosure, the drive mode generally considered is the drive mode in which the maximum torque can be provided by the parallel drive mode is greater than the maximum torque can be provided by the drive motor.

However, if the torque demand of the vehicle when driving fluctuates in the economic zone corresponding to the current speed or near the maximum torque that the drive motor can provide, frequent switching between series and parallel modes will occur.

Figure 1:
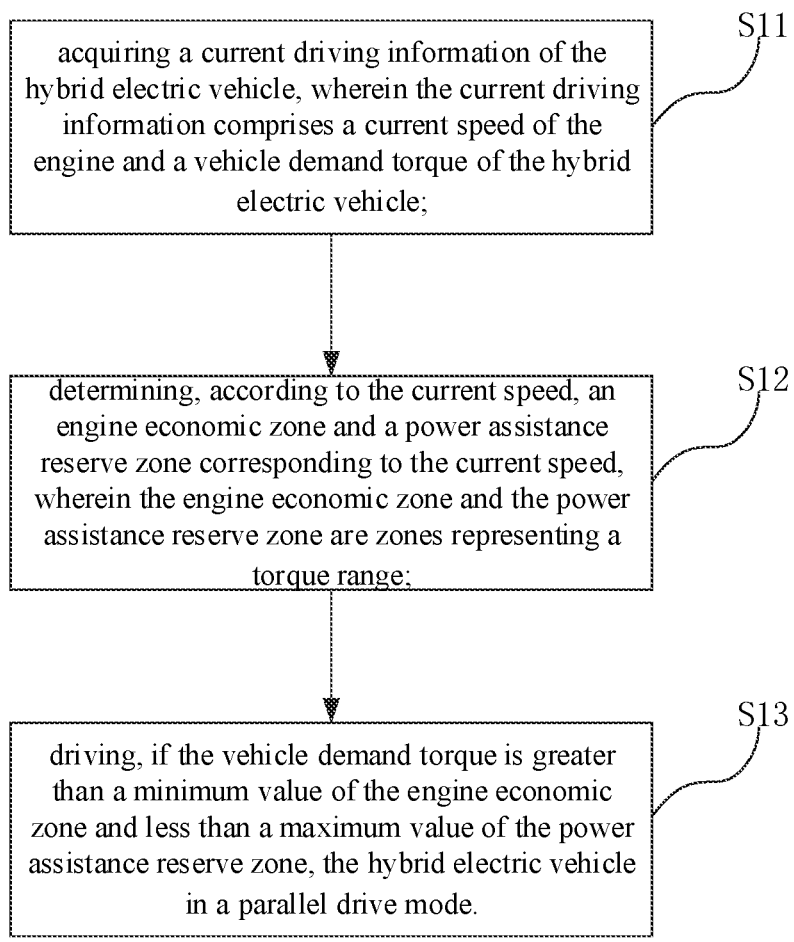
FIG. 1 is a flow chart of a method for driving a hybrid electric vehicle according to embodiments of the invention.

In order to solve the above technical problems, the embodiment of the present disclosure provides a method for driving a hybrid electric vehicle. For example, the method can be applied to the VCU of the hybrid electric vehicle, as shown in FIG. 1. The method includes:

S11, acquiring a current driving information of the hybrid electric vehicle, wherein the current driving information comprises a current speed of the engine and a vehicle demand torque of the hybrid electric vehicle;

S12, determining, according to the current speed, an engine economic zone and a power assistance reserve zone corresponding to the current speed, wherein the engine economic zone and the power assistance reserve zone are zones representing a torque range; and S13, driving, if the vehicle demand torque is greater than a minimum value of the engine economic zone and less than a maximum value of the power assistance reserve zone, the hybrid electric vehicle in a parallel drive mode;

In step S11, the current driving information of the hybrid electric vehicle can be acquired by the vehicle control unit. The current driving information includes the current speed of the engine and the vehicle demand torque of the hybrid electric vehicle. For example, the vehicle control unit can acquire the engine working state information of the hybrid electric vehicle by acquiring the electrical signal of the variable speed control unit electrically connected to the vehicle control unit. The state can include the current speed of the engine. The vehicle control unit can also acquire the demand torque of the hybrid electric vehicle by acquiring the electrical signal of the electronic stability system.

In step S12, the optimal operating point of the engine corresponding to the current speed can be acquired according to the current speed, and the engine economic zone can be determined according to the optimal operating point of the engine. The optimal operating point of the engine can be calculated by the R&D personnel in advance according to the inherent performance of the engine and stored in the vehicle control unit. The optimal operating point of the engine is positively related to the current speed and is in the engine economic zone.

Further, the power assistance reserve zone can be determined according to the engine economic zone, where the minimum value of the power assistance reserve zone is the maximum value of the engine economic zone, and the vehicle torque corresponding to the maximum value of the power assistance reserve zone is less than the maximum torque that the drive motor can provide.

When the vehicle control unit detects that the vehicle demand torque acquired in step S11 is greater than the minimum value of the engine economic zone determined in step S12, and the vehicle demand torque is less than the maximum value of the power assistance reserve zone, the vehicle control unit controls the vehicle to maintain driving in the parallel drive mode.

That is to say, in the embodiment of the present disclosure, the power assistance reserve zone is additionally set above the engine economic zone, so that when the vehicle demand torque is greater than the minimum value of the engine economic zone and less than the maximum value of the power assistance reserve zone, the hybrid electric vehicle can be driven in a parallel drive mode, which increases the range of vehicle demand torque for driving the hybrid electric vehicle in a parallel drive mode, and the problem of frequent mode switching caused by the fluctuation of the vehicle demand torque near the maximum value of the engine economic zone is avoided.

In an embodiment, when the hybrid electric vehicle is in the parallel drive mode, if the vehicle demand torque is greater than the maximum value of the engine economic zone, and the vehicle demand torque is less than the maximum value of the power assistance reserve zone, the engine is controlled to provide a torque that is less than the maximum value of the engine economic zone. For example, the torque provided by the engine at this time can be equal to the torque corresponding to the optimal operating point of the engine, and the drive motor can be controlled to provide a torque equal to the difference between the vehicle demand torque and the torque provided by the engine. At this time, it can ensure that the vehicle demand torque is greater than the maximum value of the engine economic zone, and the economic benefits of the vehicle and the driving ability of the vehicle are guaranteed.

Figure 2:
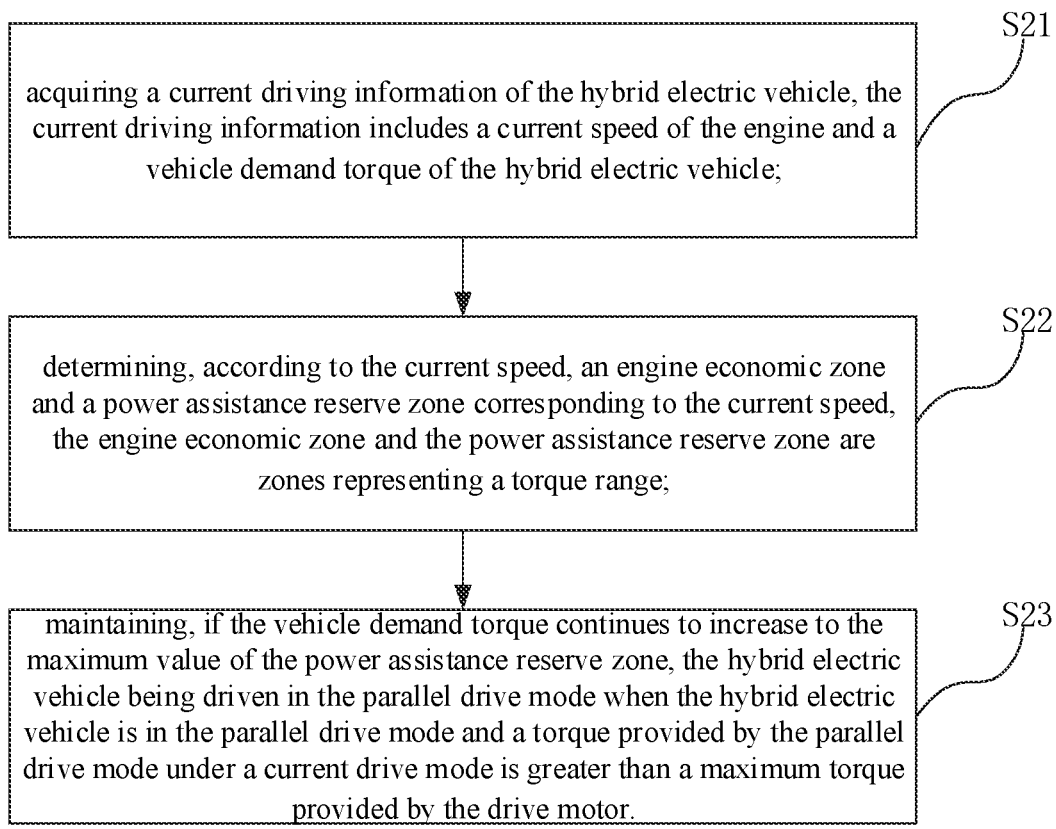
FIG. 2 is a flow chart of a method for driving a hybrid electric vehicle according to embodiments of the invention.

FIG. 2 shows a method for driving hybrid electric vehicles provided by another embodiment of the present disclosure, which is used to solve the problem that the vehicle torque continues to increase and the mode switches too frequently before reaching the maximum torque that the drive battery can provide. For example, the method can be applied to the VCU of the hybrid electric vehicle. As shown in FIG. 2, the method includes the following steps:

S21, acquiring a current driving information of the hybrid electric vehicle, the current driving information includes a current speed of the engine and a vehicle demand torque of the hybrid electric vehicle;

S22, determining, according to the current speed, an engine economic zone and a power assistance reserve zone corresponding to the current speed, the engine economic zone and the power assistance reserve zone are zones representing a torque range; and S23, maintaining, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor.

In the embodiment of the disclosure, when the vehicle is driven by the parallel drive mode, the vehicle demand torque is predicted. When the vehicle demand torque continues to increase to the maximum value of the power assistance reserve zone, the hybrid electric vehicle is maintained to be driven in the parallel drive mode during the period when the vehicle demand torque continues to increase from the maximum value of the power assistance reserve zone to the maximum torque that the drive motor can provide, and the frequency of switching drive modes of the hybrid electric vehicle is reduced.

In another embodiment, if the vehicle demand torque continues to increase to the maximum value of the power assistance reserve zone, and the vehicle demand torque does not increase to the maximum torque that can be provided by the drive motor within a preset time, the hybrid vehicle is driven by switching to the series drive mode. The preset time can be 5 seconds, for example, which can be set according to actual needs. The present disclosure does not limit herein.

Figure 3:
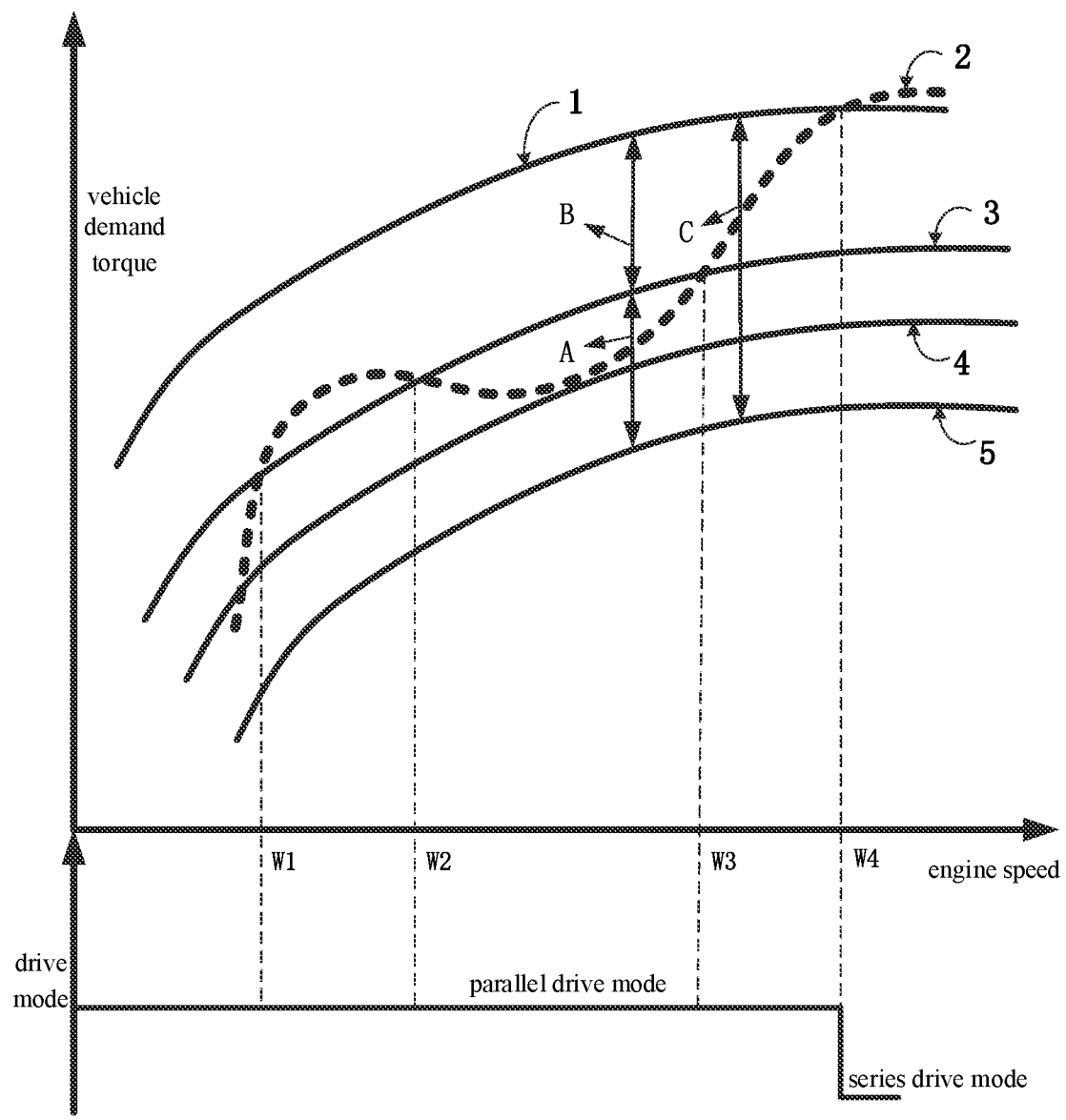
FIG. 3 is an exemplary comparison diagram between a vehicle demand torque and the vehicle drive mode in the case of adopting the method according to embodiments of the invention.

FIG. 3 is an exemplary comparison diagram between a vehicle demand torque and the vehicle drive mode in the case of adopting the method provided by an embodiment of the present disclosure. As shown in FIG. 3, a curve 4 represents a mapping relationship curve between the engine optimal operating point (the operating point value is the output torque value) and the engine speed. The range between a curve 3 and a curve 5 represents the engine economic zone corresponding to the engine speed, that is, the value of each engine speed corresponds to an engine economic zone, such as engine economic zone A shown in FIG. 3. It can be seen from the FIG. 3 that the engine economic zone always includes the engine optimal operating point. For example, in the specific implementation, the engine optimal operating point can be located in the center of the engine economic zone. The range between a curve 2 and a curve 3 represents the power assistance reserve zone corresponding to the engine speed, that is, the value of each engine speed corresponds to a power assistance reserve zone, such as power assistance reserve zone B shown in FIG. 3.

A curve 2 represented by dotted line is an example of the mapping relationship between the vehicle demand power and engine speed. In the embodiment, it can be seen that when the vehicle demand power is between the minimum value of the engine economic zone and the maximum value of the power assistance reserve zone, the vehicle always maintains the parallel drive mode. That is, when the vehicle is currently in the parallel drive mode, when the engine speed is W1 and W3 (the corresponding vehicle demand power increases to the maximum value of the engine economic zone), or in the case that the engine speed is W2 (the corresponding vehicle demand power decreases to the maximum value in the engine economic zone), the vehicle maintains the parallel drive mode unchanged, and mode switching will not occur. Only when the engine speed is W4 (the vehicle demand power increases to the maximum value in the power assistance reserve zone), the vehicle will be controlled to switch from the parallel drive mode to the series drive mode.

In summary, the range of the vehicle demand torque in parallel drive mode is between the minimum value of the engine economic zone and the maximum value of the power assistance reserve (for example, the range C shown in FIG. 3). Thus, the torque range of the vehicle driven by parallel drive mode is increased, and the number of mode switching is reduced.

Figure 4:
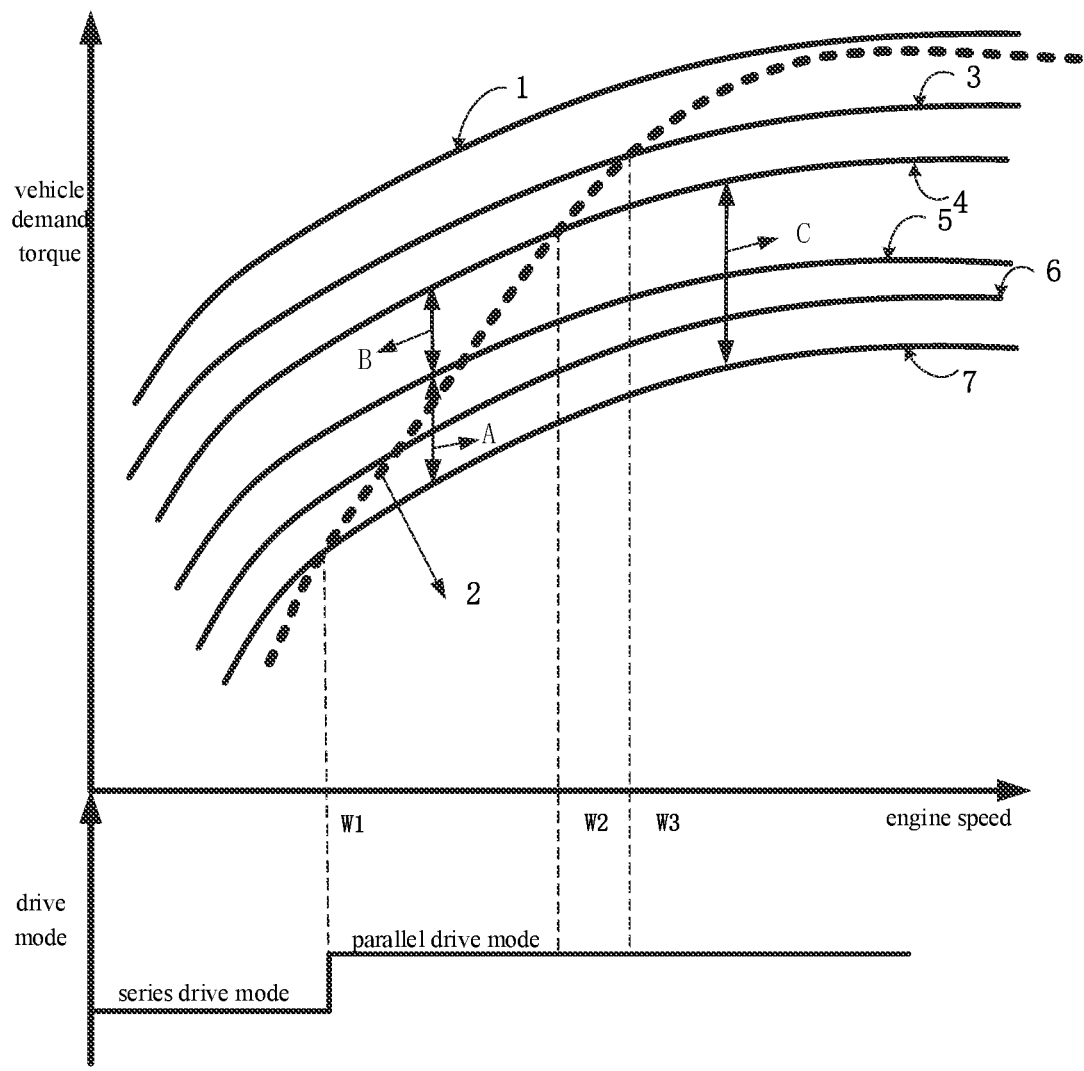
FIG. 4 is an exemplary comparison diagram between another vehicle demand torque and the vehicle drive mode in the case of adopting the method according to embodiments of the invention.

FIG. 4 is another exemplary comparison diagram between the vehicle demand torque and the vehicle drive mode in the case of adopting the method provided by the embodiments of the present disclosure. A curve 1 represents the mapping relationship curve between the maximum torque that the hybrid electric vehicle can provide in the parallel drive mode and the engine speed, that is, the sum value of the maximum torque that the engine can provide and the maximum torque that the drive motor can provide. A curve 3 represents the mapping relationship curve between the maximum torque that can be provided by the hybrid electric vehicle in series drive mode and the engine speed, that is, the maximum torque that can be provided by the drive motor. A curve 6 represents the mapping relationship curve between the optimal operating point of the engine (the operating point value is the output torque value) and the engine speed. The range between a curve 5 and a curve 7 represents the engine economic zone corresponding to the engine speed, that is, the value of each engine speed corresponds to an engine economic zone, such as engine economic zone A shown in FIG. 4. It can be seen from the FIG. 4 that the engine economic zone always includes the engine optimal operating point. For example, in the specific implementation, the engine optimal operating point can be located in the center of the engine economic zone. The range between a curve 4 and a curve 5 represents the power assistance reserve zone corresponding to the engine speed, that is, the value of each engine speed corresponds to a power assistance reserve zone, such as the power assistance reserve zone B shown in FIG. 4.

A curve 2 represented by dotted line is an example of the mapping relationship between the vehicle demand power and engine speed. Different from the curve 2 shown in FIG. 3, the mapping relationship curve represents that the vehicle demand power continues to increase with the increase of engine speed. In the embodiment, it can be seen that when the engine speed is W1, the vehicle demand torque is increase to the minimum value of the engine economic zone, and the vehicle drive mode is switched to the parallel drive mode. When the vehicle demand power is between the maximum value of the power assistance reserve zone at the current speed and the maximum torque that can be provided by the vehicle in series drive mode, the vehicle always maintains the parallel drive mode. That is, when the vehicle is currently in parallel drive mode and the vehicle demand torque continues to increase, when the engine speed is between W2 and W3 (the corresponding vehicle demand power increases to the maximum torque that the vehicle in series drive mode can provide), the vehicle maintains the parallel drive mode unchanged and mode switching will not occur.

In summary, when the vehicle is in the parallel drive mode, if the vehicle demand torque continues to increase, the vehicle demand torque maintains in the parallel drive mode when the vehicle demand torque is between the maximum value of the power assistance reserve zone and the maximum torque that can be provided by the vehicle in the series drive mode, thus avoiding frequent mode switching before the vehicle demand torque is increased to the maximum torque that can be provided by the vehicle in the series drive mode, and the number of mode switching is reduced.

Figure 5:
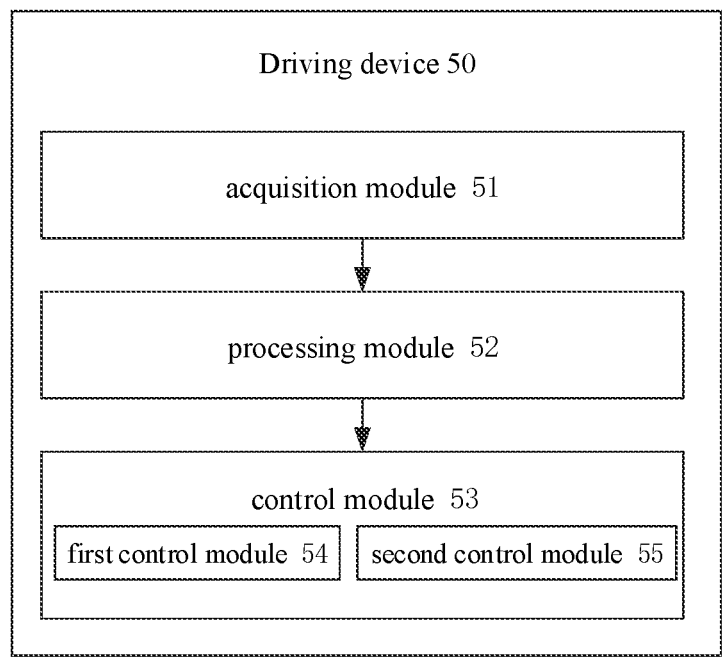
FIG. 5 is a block diagram of a device for driving a hybrid electric according to embodiments of the invention.

The embodiment of the present disclosure further provides a device 50 for driving a hybrid electric vehicle, which is used to implement the steps of the method for driving provided by the above method embodiments. The device 50 can realize the vehicle control unit on the hybrid electric vehicle in the way of software, hardware or a combination of both. The vehicle control unit can be used for the hybrid electric vehicle including the drive modes including the pure electric drive mode, the series drive mode, and the parallel drive mode, as shown in FIG. 5, the device 50 includes:

an acquisition module 51, which is configured for acquiring a current driving information of the hybrid electric vehicle, wherein the current driving information comprises a current speed of the engine and a vehicle demand torque of the hybrid electric vehicle;

a processor 52, which is configured for determining, according to the current speed, an engine economic zone and a power assistance reserve zone corresponding to the current speed, wherein the engine economic zone and the power assistance reserve zone are zones representing a torque range; and a controller 53, which includes:

a first controller 54, which is configured for driving the hybrid electric vehicle in a parallel drive mode when the vehicle demand torque is greater than a minimum value of the engine economic zone and less than a maximum value of the power assistance reserve zone; and/or a second controller 55, which is configured for maintaining, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor.

In the embodiment, the power assistance reserve zone is additionally set above the engine economic zone, so that when the vehicle demand torque is greater than the minimum value of the engine economic zone and less than the maximum value of the power assistance reserve zone, the hybrid electric vehicle can be driven in a parallel drive mode, which increases the range of vehicle demand torque for driving the hybrid electric vehicle in a parallel drive mode, and the problem of frequent mode switching caused by the fluctuation of the vehicle demand torque near the maximum value of the engine economic zone is avoided. Further, when the vehicle demand torque continues to increase to the maximum value of the power assistance reserve zone, the hybrid electric vehicle is maintained to be driven in the parallel drive mode during the period when the vehicle demand torque continues to increase from the maximum value of the power assistance reserve zone to the maximum torque that the drive motor can provide, and the frequency of switching drive modes of the hybrid electric vehicle is reduced.

In an embodiment, the processor 52 is configured for determining the engine economic zone and the power assistance reserve zone corresponding to the current speed, specifically: acquiring an optimal operating point of the engine corresponding to the current speed according to the current speed, and determining the engine economic zone according to the optimal operating point of the engine, in which the optimal operating point of the engine is positively related to the current speed and is within the engine economic zone; and determining the power assistance reserve zone according to the engine economic zone, and a minimum value of the power assistance reserve zone is a maximum value of the engine economic zone, and a vehicle torque corresponding to the maximum value of the power assistance reserve zone is less than a maximum torque that the drive motor is able to provide.

In an embodiment, the second controller 55 is configured for switching to, if after the vehicle demand torque continues to increase to the maximum value of the power assistance reserve zone, and the vehicle demand torque does not increase to a maximum torque that the drive motor is able to provide within a preset time, a series drive mode to drive the hybrid electric vehicle when the hybrid electric vehicle is in the parallel drive mode and a torque provided by the parallel drive mode under a current drive mode is greater than a maximum torque provided by the drive motor. At this time, it is ensured that if the vehicle is not lifted to the maximum torque that can be provided by the drive motor after the vehicle is lifted to the maximum value of the power assistance reserve zone for a period of time, the parallel drive mode is then abandoned, so as to reasonably distribute the vehicle power, save fuel and ensure that the vehicle power demand is met.

In an embodiment, the second controller 55 is further configured for controlling, if the vehicle demand torque is greater than a maximum value of the engine economic zone and the vehicle demand torque is less than a maximum value of the power assistance reserved zone, the engine to provide a torque less than the maximum value of the engine economic zone, for example, it can be the torque corresponding to the optimal operating point of the engine; and controlling the drive motor to provide a torque equal to a difference between the vehicle demand torque and a torque provided by the engine when the hybrid electric vehicle is in the parallel drive mode, if the vehicle demand torque is greater than a maximum value of the engine economic zone and the vehicle demand torque is less than a maximum value of the power assistance reserved zone. At this time, the vehicle engine is still working in the engine economic zone, which ensures the efficient operation of the engine and enables the power provided by the vehicle to meet the normal driving of the vehicle.

In an embodiment, the second controller 55 is further configured for sending, if the vehicle demand torque is greater than a minimum value of the engine economic zone, and the vehicle demand torque is less than a maximum value of the power assistance reserved zone, a mode switching command to switch the hybrid electric vehicle from the series drive mode or the pure electric drive mode to the parallel drive mode when the hybrid electric vehicle is in the series drive mode.

In an embodiment, the second controller 55 is further configured for sending, if the vehicle demand torque is greater than the maximum torque that the drive motor is able to provide, a mode switching command to switch the hybrid electric vehicle to the parallel drive mode when the hybrid electric vehicle is in the series drive mode, so as to ensure that the vehicle can provide enough torque for normal driving of the vehicle.

As for the device in the above embodiments, the specific mode of each module to perform operation has been described in detail in the embodiment of the method, and which will not be described in detail here.

Figure 6:
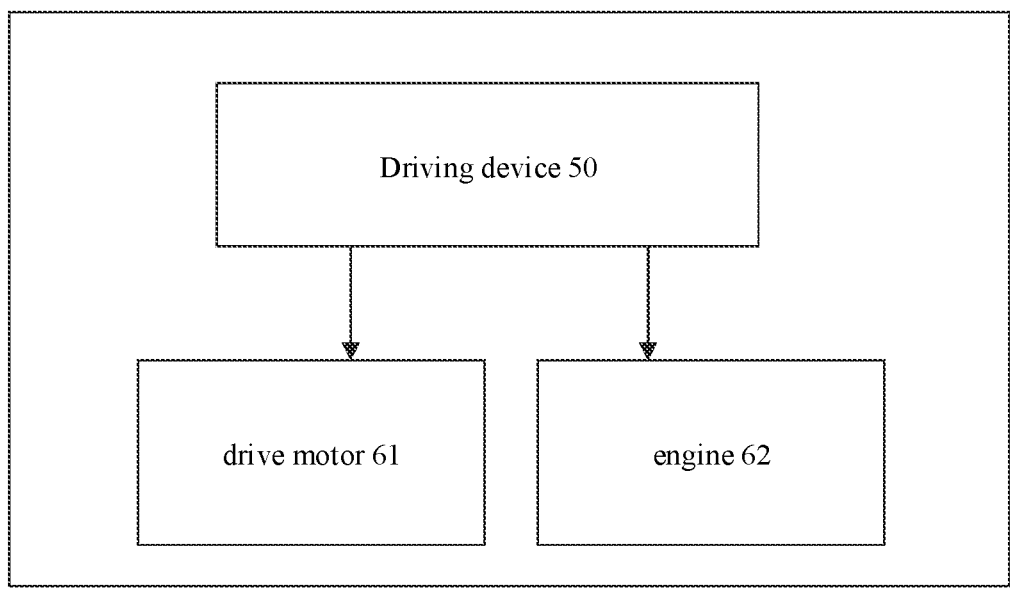
FIG. 6 is the structural block diagram of a hybrid electric vehicle according to embodiments of the invention.

Based on the same inventive concept, as shown in FIG. 6, the embodiment of the present disclosure further provides a hybrid vehicle 60, which includes a drive motor 61, an engine 62, and a driving device 50 connected with the drive motor and the engine, which is used to implement the method for driving the hybrid electric vehicle. Those skilled in the conventional art should know that, in the specific implementation, the hybrid electric vehicle further includes other components. FIG. 6 only shows the parts related to the embodiments of the present disclosure, and other necessary vehicle components are not shown in details.

In order to implement the above embodiments, the present disclosure further provides a computing processing device. The computing processing device includes:

a memory, stored therein with computer-readable codes; and at least one processors;

when the computer-readable codes are executed by the at least one processors, the computing processing device executes the method for driving a hybrid electric vehicle as described above.

In order to implement the above embodiments, the present disclosure further provides a computer program. The computer program computer-readable codes, when the computer-readable codes are executed by the computing processing device, the computing processing device executes the method for driving a hybrid electric vehicle as described above.

In order to implement the above embodiments, the present disclosure further provides a computer-readable storage medium, and a computer program as described above is stored therein.

Figure 7:
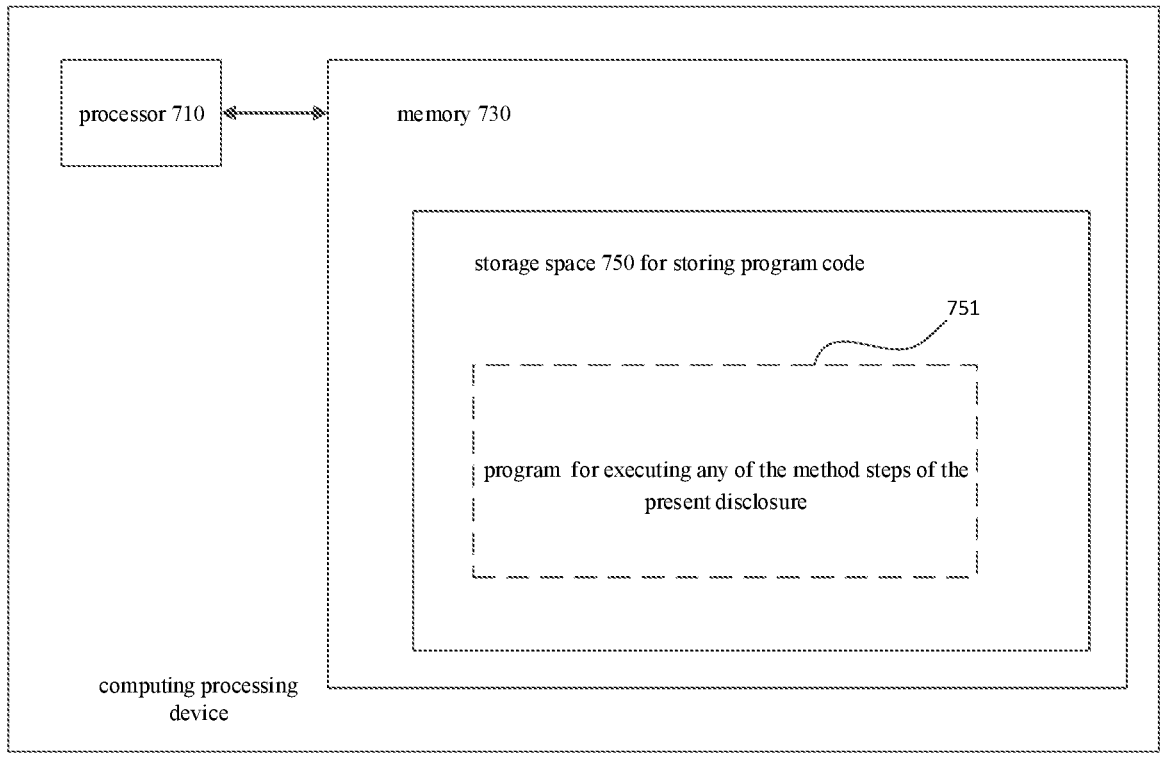
FIG. 7 is a structure diagram of a computing processing device according to embodiments of the invention.
Figure 8:
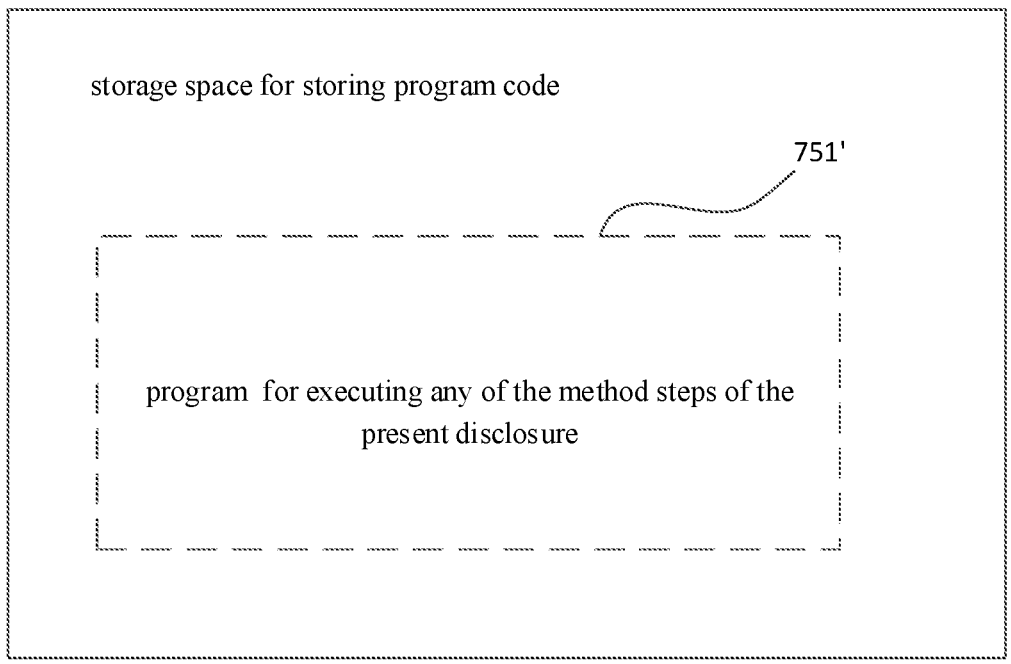
FIG. 8 is a schematic diagram of a storage unit for portable or fixed implementation of program codes according to embodiments of the method.

FIG. 7 provides a structural schematic diagram of a computing processing device for the embodiment of the present disclosure. The computing processing apparatus typically includes a processor 710 and a computer program product (non-transitory computer readable storage medium having instructions, which when executed by a processor, perform actions) or computer-readable medium in the form of a memory 730. The memory 730 may be an electronic memory such as flash memory, electrically erasable programmable read only memory (EEPROM), EPROM, hard disk, or ROM. The memory 730 has a storage space 750 of program code 751 for executing any of the method steps described above. For example, the storage space 750 for program code may include each program code 751 for implementing various steps in the above method. These program codes can be read from or written into one or more computer program products. These computer program products include program code carriers such as hard disk, compact disc (CD), memory card, or floppy disk. Such a computer program product is usually a portable or fixed storage unit as shown in FIG. 8. The storage unit may have storage segments, storage spaces, and the like arranged similarly to the memory 730 in the server of FIG. 7. The program code may be compressed in an appropriate form, for example. Generally, the storage unit includes computer readable code 751', that is, codes that can be read by a processor such as 710, when the codes are run by a server, which causes the server to perform the steps in the method described above.

In the description of the specification, reference to the description of the terms "one embodiment", "some embodiments", "examples", "specific examples", or "some examples" means that specific features, structures, materials, or features described in combination with the embodiment or example are included in at least one embodiment or example of the present disclosure. In this specification, the illustrative expression of the above terms need not refer to the same embodiments or examples. Furthermore, the specific features, structures, materials, or features described may be combined in an appropriate manner in any one or more embodiments or examples. In addition, those skilled in the conventional art can combine and combine different embodiments or examples described in this specification and the characteristics of different embodiments or examples without contradiction.

In addition, the terms "first" and "second" are only used for description purposes and cannot be understood as indicating or implying relative importance or implicitly indicating the number of indicated technical features. Thus, the features defined as "first" and "second" can explicitly or implicitly include at least one such feature. In the description of this disclosure, "multiple" means at least two, such as two, three, etc., unless otherwise specifically defined.

Any process or method description in the flow chart or otherwise described herein can be understood as representing a module, segment or part of code including one or more executable instructions for implementing the steps of a custom logic function or process, and the scope of the embodiments of the present disclosure includes additional implementations, which may not be in the order shown or discussed, It should be understood by those skilled in the conventional art of the embodiments of the present disclosure that functions are performed in a substantially simultaneous manner or in reverse order according to the functions involved.

The logic and/or steps represented in the flow chart or otherwise described herein, for example, can be considered as a sequenced list of executable instructions for implementing logic functions, which can be specifically implemented in any computer-readable medium for the instruction execution system, device or apparatus (such as a computer based system, a system including a processor, or other system that can take instructions from and execute instructions from an instruction execution system, device, or apparatus) is used, or is used in combination with, an instruction execution system, device, or apparatus. For the purposes of the specification, a "computer-readable medium" may be any device that may include, store, communicate, propagate, or transmit programs for use by or in conjunction with instruction execution system, device, or apparatus. More specific examples (non exhaustive list) of computer-readable media include the following: an electrical connector (electronic device) with one or more wiring, a portable computer disk box (magnetic device), a random access memory (RAM), a read-only memory (ROM), an erasable and editable read-only memory (EPROM or flash memory), an optical fiber device, and a portable optical disk read-only memory (CDROM). In addition, the computer-readable medium can even be a paper or other suitable medium on which the program can be printed, because the program can be acquired electronically, for example, by optical scanning of the paper or other medium, then editing, interpreting, or processing in other suitable ways when necessary, and then stored in a computer memory.

It should be understood that the various parts of the present disclosure may be implemented in hardware, software, firm ware, or a combination thereof. In the above embodiments, a plurality of steps or methods may be implemented with software or firmware stored in memory and executed by a suitable instruction execution system. For example, if the hardware implementation is the same as that in another embodiment, it can be realized by any one of the following technologies known in the conventional art or their combination: discrete logic circuit with logic gate circuit for realizing logic function on data signal, special integrated circuit with suitable combined logic gate circuit, programmable gate array (PGA), field programmable gate array (FPGA), etc.

Those skilled in the conventional art can understand that all or part of the steps carried by the method of implementing the above embodiments can be completed by instructing relevant hardware through a program. The program can be stored in a computer-readable storage medium. When the program is executed, it includes one or a combination of the steps of the method embodiment.

In addition, each functional unit in each embodiment of the present disclosure can be integrated in a processor, or each unit can exist physically independently, or two or more units can be integrated in a module. The above integrated modules can be implemented in the form of hardware or software function modules. If the integrated module is realized in the form of a software functional module and sold or used as an independent product, it can also be stored in a computer readable storage medium.

The storage medium mentioned above can be read-only memory, disk or optical disk. Although the embodiments of the present disclosure have been shown and described above, it can be understood that the above embodiments are exemplary and cannot be understood as a limitation of the present disclosure. Those skilled in the conventional art can change, modify, replace and transform the above embodiments within the scope of the present disclosure.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for driving a hybrid electric vehicle, wherein the hybrid electric vehicle comprises a drive motor and an engine, the method comprising:

acquiring, through a vehicle control unit, a current driving information of the hybrid electric vehicle, wherein the current driving information comprises a current speed of the engine and a vehicle demand torque of the hybrid electric vehicle;

determining, according to the current speed, through the vehicle control unit, an engine economic zone and a power assistance reserve zone corresponding to the current speed, wherein the engine economic zone and the power assistance reserve zone are zones representing a torque range, wherein a minimum value of the power assistance reserve zone is a maximum value of the engine economic zone, and a vehicle torque corresponding to a maximum value of the power assistance reserve zone is less than a maximum torque that the drive motor can provide;

driving, through the drive motor, if the vehicle demand torque is greater than a minimum value of the engine economic zone and less than a maximum value of the power assistance reserve zone, the hybrid electric vehicle in a parallel drive mode; or maintaining, through the vehicle control unit, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor; and switching to, if after the vehicle demand torque continues to increase to the maximum value of the power assistance reserve zone, and the vehicle demand torque does not increase to a maximum torque that the drive motor is able to provide within a preset time, a series drive mode to drive the hybrid electric vehicle when the hybrid electric vehicle is in the parallel drive mode and a torque provided by the parallel drive mode under a current drive mode is greater than a maximum torque provided by the drive motor.

2. The method according to claim 1, wherein the step of determining the engine economic zone and the power assistance reserve zone corresponding to the current speed comprises:

acquiring an optimal operating point of the engine corresponding to the current speed according to the current speed, and determining the engine economic zone according to the optimal operating point of the engine, wherein the optimal operating point of the engine is positively related to the current speed and is within the engine economic zone; and determining the power assistance reserve zone according to the engine economic zone, wherein a minimum value of the power assistance reserve zone is a maximum value of the engine economic zone, and a vehicle torque corresponding to the maximum value of the power assistance reserve zone is less than a maximum torque that the drive motor is able to provide.

3. The method according to claim 2, wherein the hybrid electric vehicle comprises drive modes, and the drive modes comprise a series drive mode and the parallel drive mode, the method further comprising:

sending, if the vehicle demand torque is greater than a minimum value of the engine economic zone, and the vehicle demand torque is less than a maximum value of the power assistance reserved zone, a mode switching command to switch the hybrid electric vehicle from the series drive mode to the parallel drive mode when the hybrid electric vehicle is in the series drive mode.

4. The method according to claim 2, wherein the hybrid electric vehicle comprises drive modes, and the drive modes comprise a series drive mode and the parallel drive mode, the method further comprising:

sending, if the vehicle demand torque is greater than the maximum torque that the drive motor is able to provide, a mode switching command to switch the hybrid electric vehicle to the parallel drive mode when the hybrid electric vehicle is in the series drive mode and a torque that the parallel drive mode is able to provide is greater than a maximum torque that the drive motor is able to provide under a current drive mode.

5. The method according to claim 1, further comprising:

controlling, if the vehicle demand torque is greater than a maximum value of the engine economic zone and the vehicle demand torque is less than a maximum value of the power assistance reserved zone, the engine to provide a torque less than the maximum value of the engine economic zone, and controlling the drive motor to provide a torque equal to a difference between the vehicle demand torque and a torque provided by the engine when the hybrid electric vehicle is in the parallel drive mode, if the vehicle demand torque is greater than a maximum value of the engine economic zone and the vehicle demand torque is less than a maximum value of the power assistance reserved zone.

6. The method according to claim 5, wherein the hybrid electric vehicle comprises drive modes, and the drive modes comprise a series drive mode and the parallel drive mode, the method further comprising:

sending, if the vehicle demand torque is greater than a minimum value of the engine economic zone, and the vehicle demand torque is less than a maximum value of the power assistance reserved zone, a mode switching command to switch the hybrid electric vehicle from the series drive mode to the parallel drive mode when the hybrid electric vehicle is in the series drive mode.

7. The method according to claim 5, wherein the hybrid electric vehicle comprises drive modes, and the drive modes comprise a series drive mode and the parallel drive mode, the method further comprising:

sending, if the vehicle demand torque is greater than the maximum torque that the drive motor is able to provide, a mode switching command to switch the hybrid electric vehicle to the parallel drive mode when the hybrid electric vehicle is in the series drive mode and a torque that the parallel drive mode is able to provide is greater than a maximum torque that the drive motor is able to provide under a current drive mode.

8. The method according to claim 1, wherein the hybrid electric vehicle comprises drive modes, and the drive modes comprise a series drive mode and a parallel drive mode, and the method further comprising:

sending, if the vehicle demand torque is greater than a minimum value of the engine economic zone, and the vehicle demand torque is less than a maximum value of the power assistance reserved zone, a mode switching command to switch the hybrid electric vehicle from the series drive mode to the parallel drive mode when the hybrid electric vehicle is in the series drive mode.

9. The method according to claim 1, wherein the hybrid electric vehicle comprises drive modes, and the drive modes comprise a series drive mode and the parallel drive mode, the method further comprising:

sending, if the vehicle demand torque is greater than the maximum torque that the drive motor is able to provide, a mode switching command to switch the hybrid electric vehicle to the parallel drive mode when the hybrid electric vehicle is in the series drive mode and a torque that the parallel drive mode is able to provide is greater than a maximum torque that the drive motor is able to provide under a current drive mode.

10. The device according to claim 1, wherein the hybrid electric vehicle comprises drive modes, and the drive modes comprise a series drive mode and the parallel drive mode, the second controller further configured for:

sending, if the vehicle demand torque is greater than a minimum value of the engine economic zone, and the vehicle demand torque is less than a maximum value of the power assistance reserved zone, a mode switching command to switch the hybrid electric vehicle from the series drive mode to the parallel drive mode when the hybrid electric vehicle is in the series drive mode.

11. A hybrid electric vehicle, comprising a drive motor, an engine, and a drive device connected with the drive motor and the engine; wherein the drive device is configured for performing a method comprising:

acquiring, through a vehicle control unit, a current driving information of the hybrid electric vehicle, wherein the current driving information comprises a current speed of the engine and a vehicle demand torque of the hybrid electric vehicle;

determining, according to the current speed, through the vehicle control unit, an engine economic zone and a power assistance reserve zone corresponding to the current speed, wherein the engine economic zone and the power assistance reserve zone are zones representing a torque range, wherein a minimum value of the power assistance reserve zone is a maximum value of the engine economic zone, and a vehicle torque corresponding to a maximum value of the power assistance reserve zone is less than a maximum torque that the drive motor can provide; and driving, through the drive motor, if the vehicle demand torque is greater than a minimum value of the engine economic zone and less than a maximum value of the power assistance reserve zone, the hybrid electric vehicle in a parallel drive mode; or maintaining, through the vehicle control unit, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor; and switching to, if after the vehicle demand torque continues to increase to the maximum value of the power assistance reserve zone, and the vehicle demand torque does not increase to a maximum torque that the drive motor is able to provide within a preset time, a series drive mode to drive the hybrid electric vehicle when the hybrid electric vehicle is in the parallel drive mode and a torque provided by the parallel drive mode under a current drive mode is greater than a maximum torque provided by the drive motor.

12. A computing processing device, comprising:

a memory, stored therein with computer-readable codes; and at least one processors;

wherein when the computer-readable codes are executed by the at least one processors, the computing processing device executes a method for driving a hybrid electric vehicle, comprising:

acquiring, through a vehicle control unit, a current driving information of the hybrid electric vehicle, wherein the current driving information comprises a current speed of the engine and a vehicle demand torque of the hybrid electric vehicle;

determining, according to the current speed, through the vehicle control unit, an engine economic zone and a power assistance reserve zone corresponding to the current speed, wherein the engine economic zone and the power assistance reserve zone are zones representing a torque range, wherein a minimum value of the power assistance reserve zone is a maximum value of the engine economic zone, and a vehicle torque corresponding to a maximum value of the power assistance reserve zone is less than a maximum torque that the drive motor can provide; and driving, through the drive motor, if the vehicle demand torque is greater than a minimum value of the engine economic zone and less than a maximum value of the power assistance reserve zone, the hybrid electric vehicle in a parallel drive mode; or maintaining, through the vehicle control unit, if the vehicle demand torque continues to increase to the maximum value of the power assistance reserve zone, the hybrid electric vehicle being driven in the parallel drive mode when the hybrid electric vehicle is in the parallel drive mode and a torque provided by the parallel drive mode under a current drive mode is greater than a maximum torque provided by the drive motor; and switching to, if after the vehicle demand torque continues to increase to the maximum value of the power assistance reserve zone, and the vehicle demand torque does not increase to a maximum torque that the drive motor is able to provide within a preset time, a series drive mode to drive the hybrid electric vehicle when the hybrid electric vehicle is in the parallel drive mode and a torque provided by the parallel drive mode under a current drive mode is greater than a maximum torque provided by the drive motor.

* * * * *